(12) United States Patent
Grenga (10) Patent No.: US 9,771,159 B1
(45) Date of Patent: Sep. 26, 2017

(54) MULTI-RING MECHANICAL RELEASE WITH SIDE ACTIVATION

(71) Applicant: The United States of America as Represented by the Secretary of the Army, Washington, DC (US)

(72) Inventor: Todd Grenga, Cumberland, RI (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 56 days.

(21) Appl. No.: 14/945,809

(22) Filed: Nov. 19, 2015

(51) Int. Cl.
*B64D 17/70* (2006.01)
*B64D 17/52* (2006.01)

(52) U.S. Cl.
CPC .............. *B64D 17/70* (2013.01); *B64D 17/52* (2013.01); *Y10S 24/36* (2013.01); *Y10T 24/4501* (2015.01); *Y10T 24/45675* (2015.01); *Y10T 24/45686* (2015.01)

(58) Field of Classification Search
CPC ........ B47D 17/38; B47D 17/52; B47D 17/70; Y10S 24/36; Y10T 24/45686; Y10T 24/45675; Y10T 24/4501
See application file for complete search history.

(56) References Cited

U.S. PATENT DOCUMENTS

| | | | | |
|---|---|---|---|---|
| 2,864,361 | A | * 12/1958 | Johnson | B63C 11/30 224/628 |
| 6,249,937 | B1 | * 6/2001 | Grenga | B64D 17/32 24/602 |
| 6,644,597 | B1 | 11/2003 | Bahniuk | |
| 6,796,531 | B1 | 9/2004 | Anderson et al. | |
| 7,313,848 | B2 | 1/2008 | Forster et al. | |
| 2013/0146713 | A1 | * 6/2013 | Fitzgerald | B64D 17/38 244/151 B |
| 2013/0175399 | A1 | 7/2013 | Fitzgerald | |

* cited by examiner

*Primary Examiner* — Robert J Sandy
(74) *Attorney, Agent, or Firm* — Roger C Phillips (57) ABSTRACT

A canopy release assembly includes a base plate member and a pin assembly movably coupled to the base plate member. The pin assembly is configured to move to and from a locked state and an unlocked state. A cover is pivotally coupled to the base plate member and is configured to move to and from a closed state to an open state. A first release member has a first end coupled to the pin assembly and is configured to move the pin assembly to the unlocked state in the open state of the cover. A second release member is coupled to the cover and configured to engage the pin assembly in the closed state of the cover to move the pin assembly to the unlocked state.

20 Claims, 8 Drawing Sheets

MULTI-RING MECHANICAL RELEASE WITH SIDE ACTIVATION

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate generally to the field of parachutes, and in particular to a laterally activatable parachute canopy release.

BACKGROUND

Within the Department of Defense there is a mission to deliver a large number of Soldiers to a forward position by parachute. The jumpers are equipped with harnesses and parachutes to slow their descent. All modern parachute systems have a means of separating the parachute from the harness for emergencies and continued execution of the mission once on the ground. The means of separation is called a Parachute or Canopy Release Assembly.

Parachute systems worn by the Airborne Soldier utilize a solid mechanical release to connect the riser to the main harness. Sport jumpers use a release that is referred to as a 3-Ring Canopy Release. The 3-Ring Canopy Release is a series of three interlocking rings held closed by a loop of textile cord. The cord is locked in place by nylon-coated steel cable ripcord. Each ring uses mechanical advantage to reduce the load held by the previous ring. The structure creates a significant mechanical aadvantage. At 10 to 1, the textile loop would only have to restrain $1/10^{th}$ the load acting on the riser. Other configurations attempt to increase the mechanical advantages by adding more rings, such as 4 and 5-ring assemblies.

The final closure of a multi-ring release is a textile loop held in place by a ripcord. When the ripcord is pulled free from the textile loop, the loop flexes and releases the smallest of the metallic rings. In turn, each ring releases the next successively larger ring until the riser is set free.

Past efforts have been made to include a multi-ring release into the airborne soldier harness system. Several factors make a multi-ring assembly attractive. However, due to the large variation in body sizes the harnesses have to fit, the ripcord method is not applicable.

The standard 3-Ring assembly has a large base ring, cord loop, and ripcord sewn into the harness. The latching rings of the release are sewn into the parachute riser. This configuration works with the ripcord because the ripcord can be any length and is flexible.

One hazard of this orientation is the chance of the multiple rings impacting the face of the jumper during release. Since the intent is to apply the multi-ring to a large number of jumpers, the chance of injury is greatly increased. Additionally, the length of the ripcord needs to accommodate the $95^{th}$ percentile male. This length may be too much for the $5^{th}$ percentile female arm length to properly activate.

One attempt to overcome these hazards is to invert the multi-ring release. However, simply inverting the multi-ring release is not easily accomplished. Localizing the release activation means to the chest/shoulder area accommodates standardization for all jumpers. To accomplish the range of adjustability, many straps of the harness are discontinuous and are joined with clips. This prohibits the ripcord from being properly shielded throughout its path within the harness.

Accordingly, it would be desirable to provide a canopy release that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a canopy release assembly. In one embodiment, the canopy release assembly includes a base plate member and a pin assembly movably coupled to the base plate member. The pin assembly is configured to move to and from a locked state and an unlocked state. A cover is pivotally coupled to the base plate member and is configured to move to and from a closed state to an open state. A first release member has a first end coupled to the pin assembly and is configured to move the pin assembly to the unlocked state in the open state of the cover. A second release member is coupled to the cover and configured to engage the pin assembly in the closed state of the cover to move the pin assembly to the unlocked state.

Another aspect of the disclosed embodiments is directed to a canopy release assembly for a parachute. In one embodiment, the canopy release includes a base plate member; a cover pivotally coupled to the base plate member and configured to pivot between an open state and a closed state; an activation lanyard retaining member movably coupled to the base plate member and configured to move between an unlocked state and a locked state; a first release member having one end coupled to the activation lanyard retaining member configured to move the activation lanyard retaining member to the unlocked state in the open state of the cover; and a laterally activated second release member disposed on an inside portion of the cover and configured to movably engage the activation lanyard retaining member to the unlocked state in the closed state of the cover.

A further aspect of the disclosed embodiments is directed to a latching assembly for a parachute canopy release. In one embodiment, the latching assembly includes a base plate member, an activation lanyard retaining member movably coupled to the base plate member, a cover pivotally coupled to the base plate member, the cover having a first closed state that covers the activation lanyard retaining member and a second open state where the activation lanyard retaining member is not covered. The activation lanyard retaining member includes a pull release that is configured to be activated when the cover is in the second open state. The cover includes a lever disposed on a side of the cover, the lever configured to be activated when the cover is in the first closed state, wherein activation of the pull release or lever moves the activation lanyard retaining member to a release position.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

Figure 1:
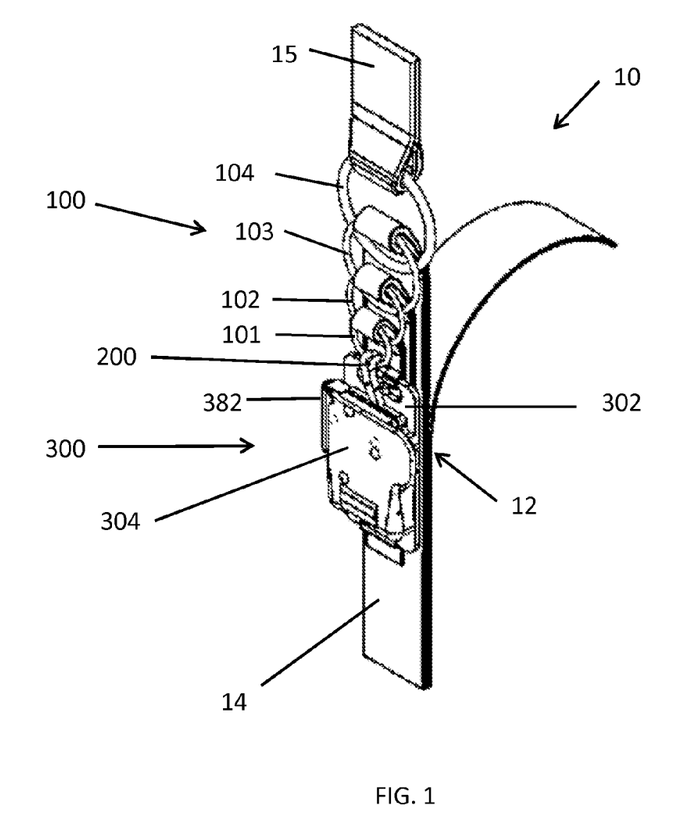
FIG. 1 illustrates a left side perspective front view of a canopy release assembly incorporating aspects of the disclosed embodiments.

Referring to FIG. 1, one embodiment of a parachute canopy release assembly 10 incorporating aspects of the disclosed embodiments is illustrated. The aspects of the disclosed embodiments are directed to a multi-ring mechanical canopy release with an additional side or lateral activation. The canopy release of the disclosed embodiments is a mechanical device that simulates the function of the ripcord at a finite length and provides an activation means similar to what soldiers are currently using. The lateral or side activation advantageously provides soldiers being dragged on their bellies the ability to release.

Referring to FIGS. 1-4, in one embodiment, the parachute canopy release assembly 10 includes a multi-ring assembly 100, an activation lanyard 200 and a latch assembly 300. In the example of FIG. 1, the multi-ring assembly 100 comprises a series of four interlocking rings 101-104. The rings 101-104 are secured to the harness assembly 12 in a manner as is generally understood. In one embodiment, the rings 101-104 are sewn to the harness assembly 12.

In the example of FIG. 1, ring 101 is shown as being the smaller of the rings 101-104, while ring 104 is the largest. In this example, ring 104 may be referred to as the riser ring and is secured to the webbing portion 15 of the parachute riser that is coupled to the canopy (not shown). The riser ring 104 provides the attachment point between the parachute or canopy and the harness assembly 12. The smallest ring 101, also referred to as a securing ring, in this example is secured to the webbing portion 14 of the harness assembly 12. Although four rings 101-104 are shown in the example of FIG. 1, in alternate embodiments any suitable number of rings can be used, other than including four.

The rings 101-104 will comprise any suitable type of rings, as is generally understood. In one embodiment, the material of the rings 101-104 can comprise steel. In alternate embodiments, the rings 101-104 can comprise any suitable material.

In a manner as is generally understood, the activation lanyard 200 is used to hold the interlocking rings 101-104 in a closed, or locked position. The activation lanyard 200 generally comprises a textile cord and is configured to be secured in place, or in the closed or locked position, by the latch assembly 300. When the activation lanyard 200 is released, the smallest of the rings, ring 101, is unlocked or released. In turn, each ring in the ring assembly 100 releases the next successively larger ring, until the riser ring 104 is set free and the canopy is released.

Figure 3:
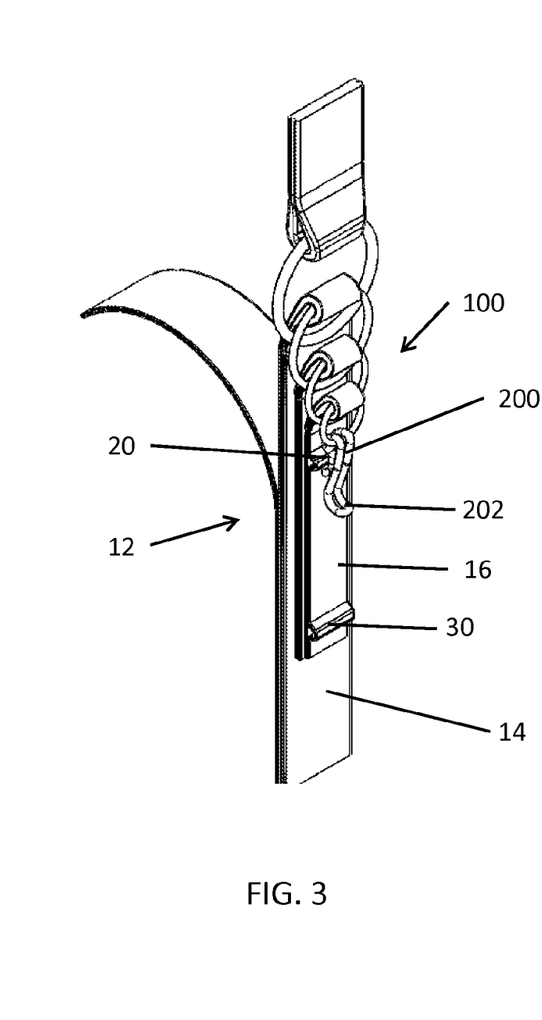
FIG. 3 illustrates the harness assembly for a canopy release assembly incorporating aspects of the disclosed embodiments
Figure 4:
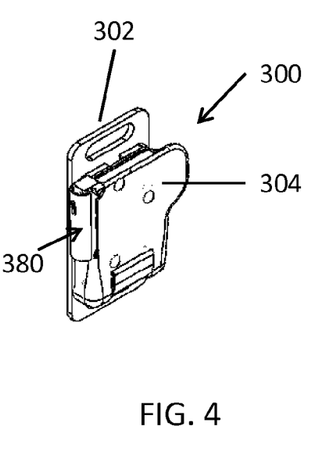
FIG. 4 illustrates a perspective view of a latching assembly for a canopy release assembly incorporating aspects of the disclosed embodiments.

Referring to FIG. 4, one embodiment of the latch assembly 300 is illustrated. In this example, the latch assembly 300 is in the closed state. As shown in FIG. 4, the latch assembly 300 includes a base plate member 302 and a cover 304. The cover 304 is generally referred to as a safety cover. The base plate 302 provides an interface between the latch assembly 300 and the harness assembly 12 shown in FIGS. 1-3. The safety cover 304 is pivotally coupled to the base plate member 302 and is used to secure the activation lanyard 200 within the latch assembly 300. The safety cover 304 generally has two states. A first or closed state, such as that shown in FIG. 4. A second or open state is shown in the example of FIG. 5.

Figure 5:
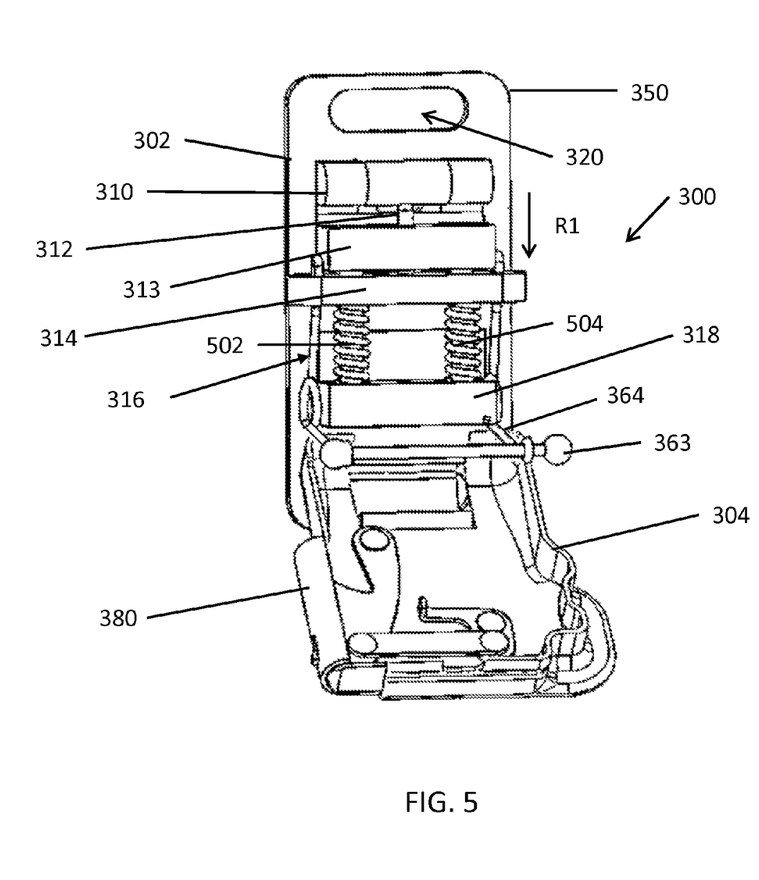
FIG. 5 illustrates a front view of a latching assembly incorporating aspects of the disclosed embodiments, with safety cover in an open state.

In the example of FIG. 5, the upper end 305 of the safety cover 304 is configured to pivot away from the base plate member 302 to expose the latch assembly 300. In this open state, the latch assembly 300 is configured to be activated from the front of the user's torso, as well be described below.

FIG. 5 illustrates the interior components for an exemplary latch assembly 300 incorporating aspects of the disclosed embodiments. In this example, the latch assembly 300 includes the base plate 302, the safety cover 304, a barrel member 310, a pin mechanism or activation lanyard retaining member 312, a pin retaining member 313, a pin base member 314, spring assembly 316 and spring base member 318. As noted, the base plate 302 provides an interface with the harness assembly 12 shown in FIG. 1, and also provides support and alignment of the pin 312.

Figure 6:
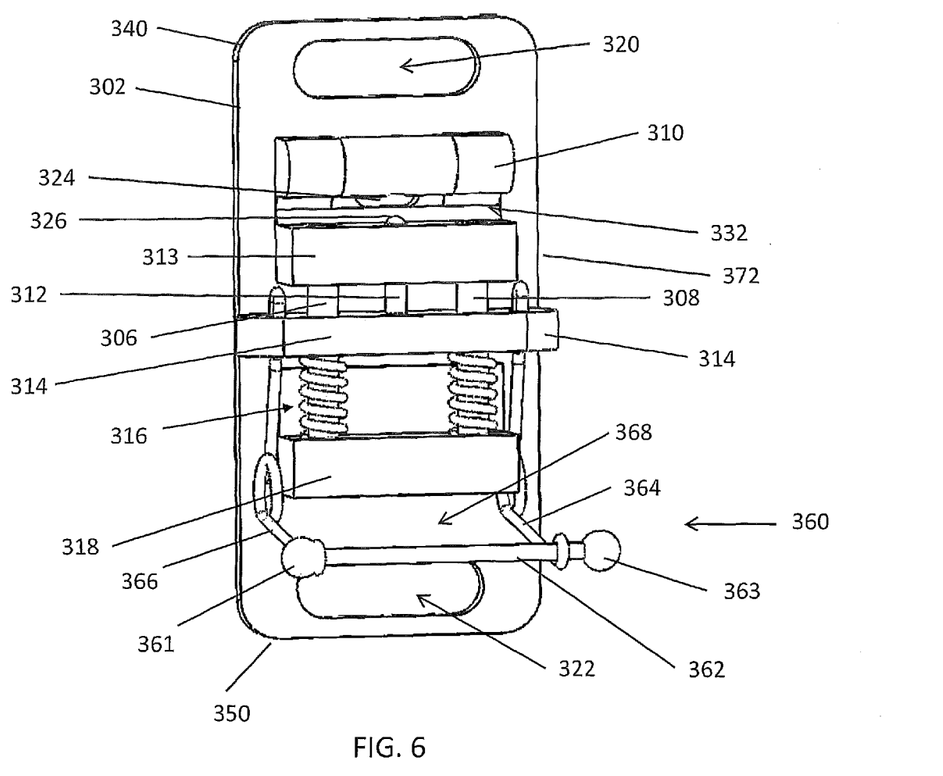
FIG. 6 illustrates a front plan view of a latching assembly incorporating aspects of the disclosed embodiments, without the safety cover.

In the examples of FIGS. 5 and 6, the base plate 302 includes one or more openings or slots 320, 322. For purposes of the description herein, slot 320 is in what is referred to as the upper end 340 of the base plate 302. The other slot 322, illustrated in FIG. 6, will be described with respect to the lower end 350 of the base plate 302. While the example herein shown only one slot in each of the upper end 340 and lower end 350 of the base plate member 302, in alternate embodiments any number of slots can be used. The slots 320, 322 provide clearance for the webbing portion 14, including the free ends 20, 30, (FIG. 3) of the harness assembly 12 to pass through.

Referring to FIG. 3, for example, a central area 16 of the webbing 14 is secured to the harness 12, such as by sewing.

Figure 7:
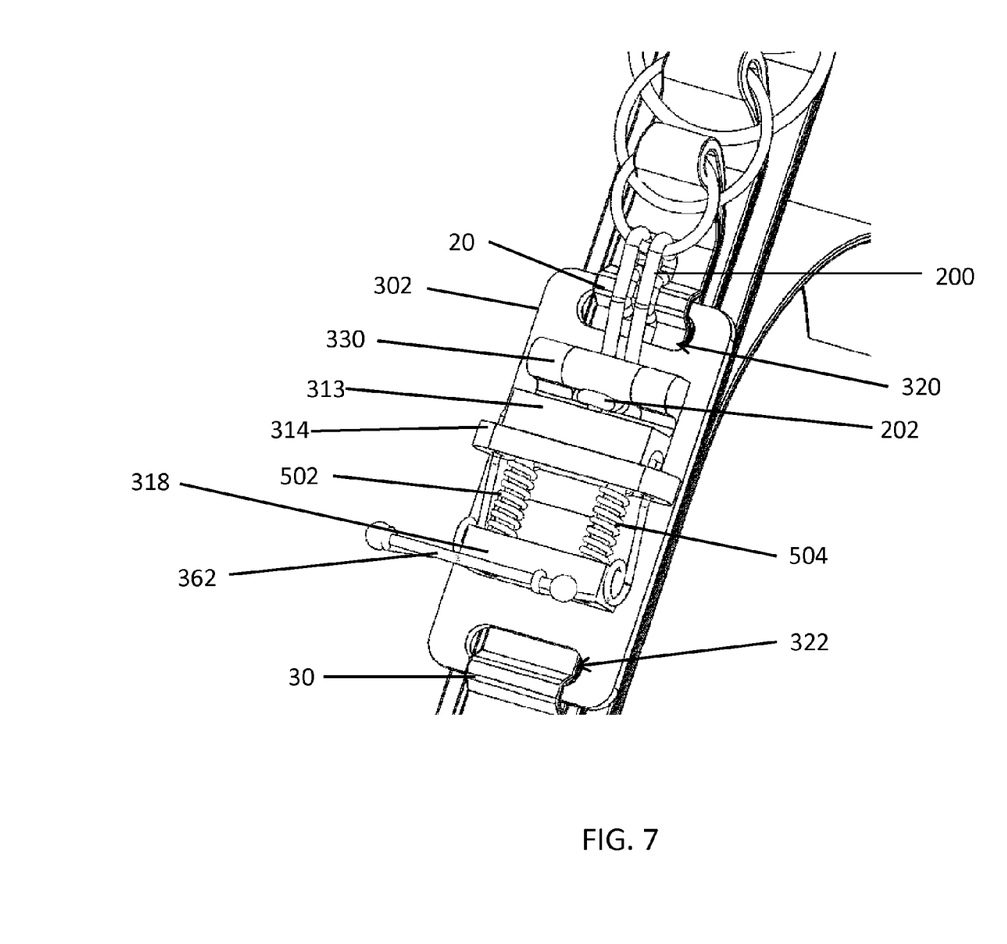
FIG. 7 illustrates a perspective front view of a canopy release assembly incorporating aspects of the disclosed embodiments installed on the harness, without the safety cover.

The free ends 20, 30 of the webbing 14 pass through the slots 320, 322 in the base plate 302, as is shown in FIG. 7. The free ends 20, 30 of the webbing 14 are then sewn to the harness 12, both above and below the base plate 302. Due to the mechanical advantage of the multi-ring release, anchoring the base plate 302 to the harness 12 does not require great strength.

In one embodiment, referring to FIGS. 5-7, a barrel 310 is formed in the base plate 302 to provide a smooth surface for the activation lanyard 200, also referred to as a textile loop, to rest on. Several holes 324 (FIG. 6) may be provided in the base plate 302 to allow the activation lanyard 200 access to the barrel 310 from multiple directions.

Referring to FIG. 5, the pin member 312 comprises a metal rod with a rounded end 326 (FIG. 6) designed to fit through the loop portion 202 (FIG. 7) of the activation lanyard 200. The pin member 312 is coupled to a base member 314 and retained in a pin retaining member 313. The pin member 312 and base member 314 are configured to move in the vertical direction along guide members 306, 308. In one embodiment, the guide members 306, 308 extend from, and are coupled to, the pin retaining member 313 to the spring base member 318. The pin member 312 is configured to capture a loop portion 202 of the activation lanyard 200 in a locked state of the pin member 312.

To ensure proper capture of the loop portion 202 of the activation lanyard 200 by the pin 312, the pin 312 extends out from the pin retaining member 313 and sits inside a recess or cavity [not visible] formed in the barrel 310, while the canopy release assembly 10 is in a latched state. The "latched state" generally refers to a state of the assembly 10 where the safety cover 304 is closed and the activation lanyard 200 is secured by the latch assembly 300. FIGS. 1 and 7 provide examples of the latched state of the canopy release assembly 10.

In the example of FIGS. 5-7, a spring assembly 316 is used to hold or support the pin 312. In the example of FIGS. 5-7, the spring assembly 316 comprises two spring members 502, 504. In alternate embodiments, the spring assembly 316 can comprise any suitable number of spring members, other than including two. As shown in FIG. 6, in one embodiment, the spring members 502, 504 are disposed on the guide members 306, 308 and biased between the pin base member 314 and the spring base member 318. A compression of the spring members 502, 504 will result in movement of the pin 312 to release the activation lanyard 200. The movement of the pin 312 has to be sufficient for the loop portion 202 of the activation lanyard 200 to clear the space between the barrel 310 and pin retaining member 313, as is shown for example in FIG. 7. In one embodiment, the space has a distance that is larger than a width or diameter of the activation lanyard 200.

The spring assembly 316 is used to push the pin 312 through the loop portion 202 of the activation lanyard 200. The spring assembly 316 also provides resistance to the jumper during activation of the canopy release assembly 10. Proper sizing of the spring assembly 316 can provide control over the activation force required. The spring assembly 316 acts between a stationary point on the spring base member 318 and the pin base member 314 of the pin 312.

As shown in FIG. 5, the spring base member 318 is provided for the spring assembly 316 to act against, when the safety cover 304 is closed and the release assembly 10 is in the closed, or latched state. One end of the spring assembly 312 can be secured within the spring base member 318. The other end of the spring assembly 312 acts against the pin base member 314.

Referring to FIG. 6, in one embodiment, a pull cable assembly 360 is shown. The pull cable assembly 360 is comprised of three components, a pull cable or handle release member 362 and two spring arm members 364, 366. The release member 362 is anchored to the spring arm members 364, 366. The swaged end balls 361, 363 are used to retain the pull cable release member 362 on the spring arm members 364, 366. The spring arm members 364, 366 are configured to allow the pull cable assembly 360 to be tucked into the safety cover 304, in a compressed state, until needed. Opening the safety cover 304 allows the spring arm members 364, 366 to expand or open and present the pull cable release member 362 to the jumper. In the open state of the safety cover 304, the pull cable release member 362 can be used to release the activation lanyard 200.

The pull cable assembly 360 is configured to provide a reasonably large "handle" for the jumper to find when activation is needed. The loop form of the pull cable assembly 360, comprised of the pull cable release member 362 and spring arm members 362, 364 allows for the easy insertion of fingers or thumb into the loop area 368. The size of the loop area 368 can be configured to accommodate the use of winter gear by the jumper.

At its upper end 372, the pull cable assembly 360 is connected to the base 314 of the pin 312. Tension placed on the spring arms 364, 366 via the pull cable release member 362 motivates the pin member 312 downward against the spring assembly 316. After a pre-determined amount of movement of the pin 312, the activation lanyard 200 is released. The movement must be sufficient to allow the activation lanyard 200 to slide between the barrel member 310 and the pin retaining member 313.

In one embodiment, referring to FIGS. 5 and 6, one method of releasing the activation lanyard 200 includes opening the safety cover 304 to expose the pull cable release member 362 of the pull cable assembly 360. The pull cable release member 362 can then be grabbed or pulled, which motivates the pin member base 314 and pin member 312 downward. The downward movement of the pin member 312 will release the loop end 202 of the activation lanyard 200. This frees the activation lanyard 200 and releases the ring assembly 100 to release the parachute canopy.

The jumper is protected against early release by providing two steps to activate the canopy release assembly 10. Tension on the pull cable release 362 is the second step. The initial step is to open the safety cover 304. The safety cover 304 is configured to provide a significant resistance to opening, ensuring that the activation lanyard 200 cannot snag and inadvertently disengage. Opening the safety cover 304 will not activate the canopy release assembly 10 to release the activation lanyard 200, but will allow the pull cable release 362 to be presented for release.

The opening of the safety cover 304 and activation of the pull cable release assembly 360 as described above generally occurs from the front of the torso of the user. However, if the user is not able to access the safety cover 304, such as for example if the user or jumper is being dragged on their belly, the aspects of the disclosed embodiments allow for the pull cable release assembly 360 to be activated laterally. In this manner, the pull cable release assembly 360 provides multiple directions of activation.

Figure 2:
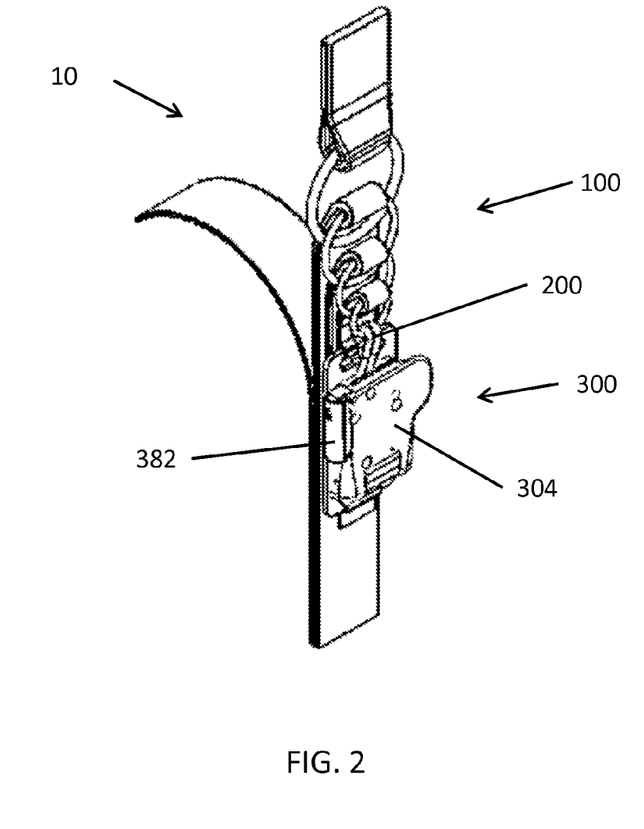
FIG. 2 illustrates a right side perspective view of the canopy release assembly of FIG. 1.
Figure 8:
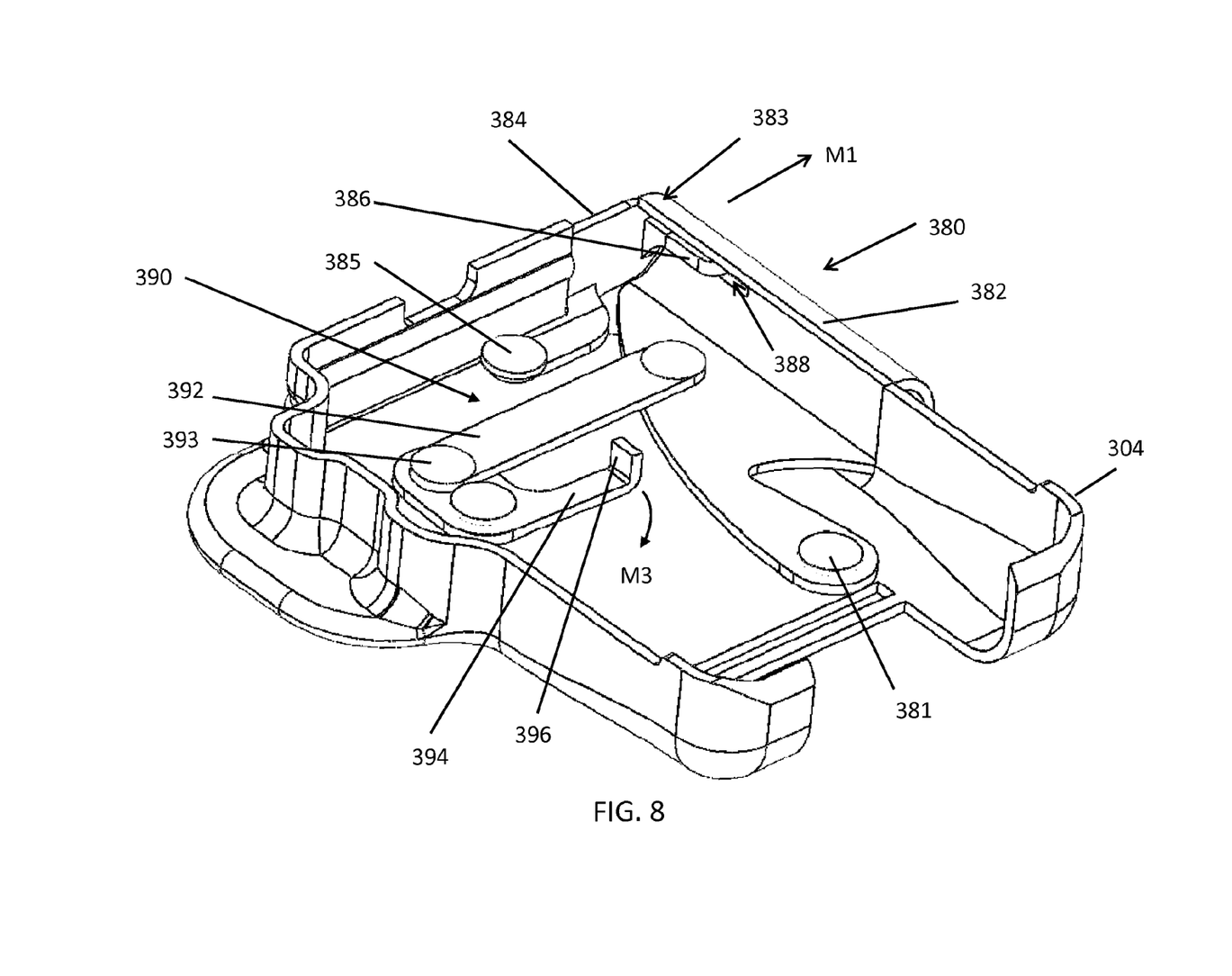
FIG. 8 illustrates a perspective view of an inside portion of a safety cover incorporating aspects of the disclosed embodiments.
Figure 9:
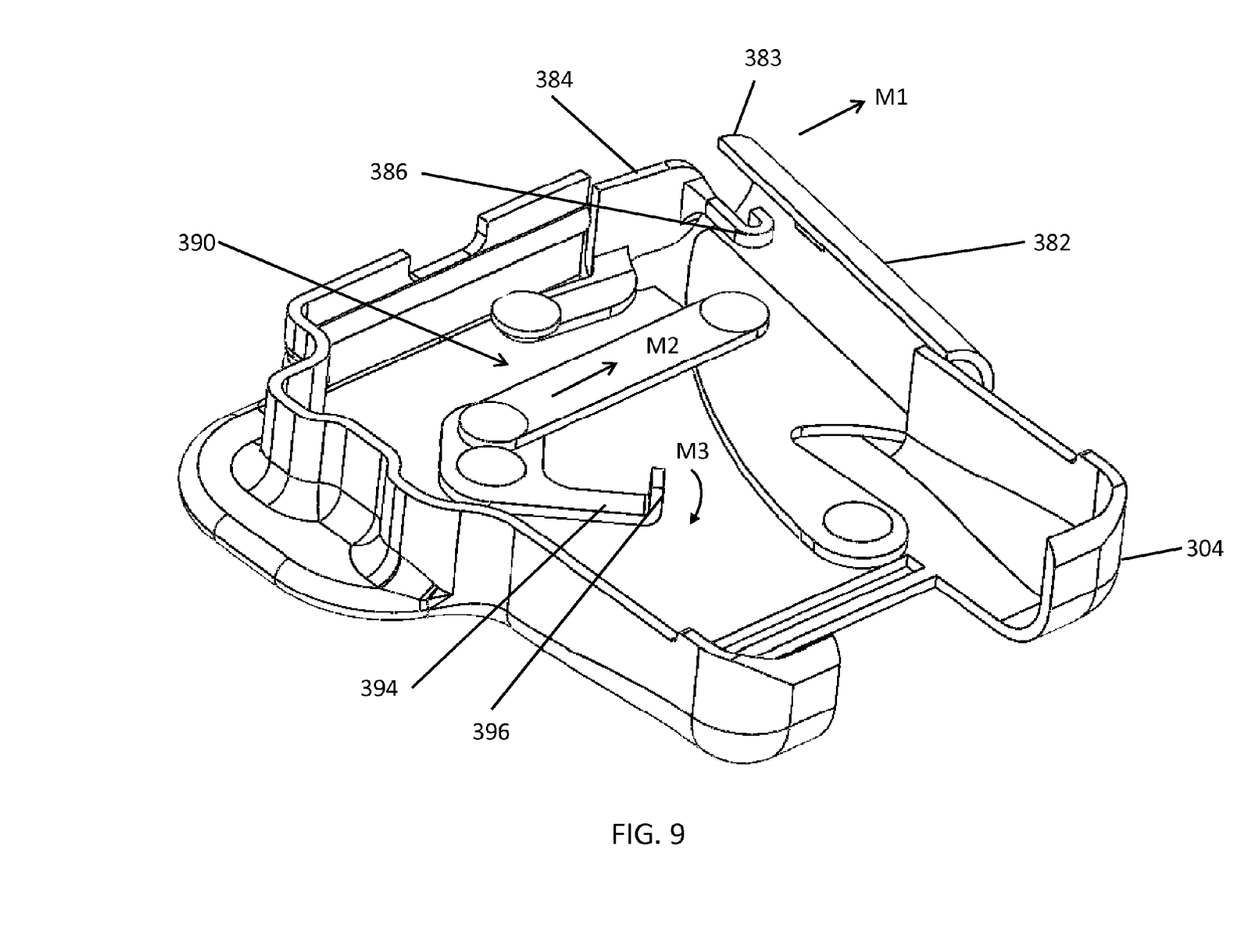
FIG. 9 illustrates a perspective view of an inside portion of a safety cover incorporating aspects of the disclosed embodiments, with the lever in an activated or open state.

Referring to FIG. 2, in one embodiment, the canopy release assembly 10 includes a side lever 382. The side lever 382, examples of which are also shown in FIGS. 5, 8 and 9, provides for lateral activation of the pull cable release assembly 360 to release the activation lanyard 200. The lateral release assembly 380 shown in FIGS. 8 and 9 is configured to enable activation of the canopy release 10 independently of the position or state of the safety cover 304. In particular, the lateral release assembly 380 enables activation of the canopy release 10 to release the canopy when the safety cover 304 is in the closed position or state.

Referring to FIGS. 8 and 9, in one embodiment, lateral release assembly 380 is part of the safety cover 304. As will be described below, the lateral activation requires two distinct motions to operate, which provides a similar safety level as the primary means of release of the canopy.

As shown in FIGS. 8 and 9, the lateral release assembly 380 comprises a lever member 382, a catch member 384 and a spring member (not shown). The lever 382, which is pivotally coupled to the safety cover 304 at pivot point 381, is configured to provide a lateral pull in the direction M1 when activated. The lever 382 is sized and shaped such that a finger of the user can be inserted into an opening formed by the top portion 386 of the lever 382.

The catch member 384 is pivotally coupled to the safety cover 304 at pivot point 385. The catch member 384 is normally biased in the closed position as is shown in FIG. 8. In one embodiment, a spring member (not shown) is used to bias the catch member 384 in the closed position. The catch 384 and spring member (not shown) act to secure the lever 382 in the closed position as shown in FIG. 8. A hook portion 386 of the catch 384 engages an opening or recess 388 in the lever 382. The spring biases the catch 384 in a direction to prevent the lever assembly 380 from inadvertently opening.

Inserting a finger onto the area defined by the top 383 of the lever 382 immediately applies force to the catch 384. Further compression of the catch 384 allows the catch 384 to travel far enough to release the hook portion 386 of the catch 384 from the opening 388. This releases the lever 382 from the catch 384. At this time, the finger force must be transferred from pushing through the catch 384 to pulling outward on the lever 382 in the direction generally indicated by arrow M1.

The outward movement of the lever 382 in the direction M1 operates a linkage assembly 390 which applies a down force to the base member 314 of the pin 312. In the example of FIGS. 8 and 9, the linkage assembly 390 comprises a connecting arm member 392 and a pivoting arm member 394. The connecting arm 392 couples the lever 382 to the pivoting arm 394 at pivot point 393.

As the lever 382 moves in the direction M1, the connecting arm member 392 moves in the direction M2. The movement of the connecting arm member 392 generates a rotational movement of the pivot arm member 394 about the pivot point 393 in the direction M3. A tab member 396 of the pivot arm member 394 is configured to engage the base member 314 of the pin member 312 shown in FIGS. 5 and 6.

As the tab member 396 applies force to the base member 314, corresponding to the movement of the side lever 382, the base member 314 and pin member 312 of FIG. 5 move in the downward or release direction R1. An example of this movement of tab member 396 is shown in FIG. 9 by M3. This movement will release the loop end 202 of the activation lanyard 200 as is described herein. The parachute canopy will be released. Thus, even without the ability to open the safety cover 304, the canopy release assembly 10 can be activated.

The aspects of the disclosed embodiments provide a mechanical latch that simulates the function of the ripcord that is needed for the multi-ring release and retains the same operation as the full mechanical release. The canopy release of the disclosed embodiments also provides for lateral activation, towards the left or right of the chest, to allow release while being dragged on the belly.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A canopy release assembly, comprising:
   a base plate member;
   a pin assembly movably coupled to the base plate member, the pin assembly configured to move to and from a locked state and an unlocked state;
   a cover pivotally coupled to the base plate member, the cover configured to move to and from a closed state to an open state; and
   a first release member having a first end coupled to the pin assembly and configured to move the pin assembly to the unlocked state in the open state of the cover; and
   a second release member coupled to the cover and configured to engage the pin assembly in the closed state of the cover to move the pin assembly to the unlocked state.

2. The canopy release assembly of claim 1, wherein the first release member is activated from a front of the canopy release member when the safety cover is in the open state and the second release member is activated from a side of the canopy release member when the safety cover is in the closed state.

3. The canopy release assembly of claim 1, wherein a second end of the first release member is a handle member and a spring arm is disposed between the first end and the second end of the first release member.

4. The canopy release assembly of claim 3, wherein the first release member is compressed when the safety cover is in the closed state and uncompressed when the safety cover is in the open state.

5. The canopy release assembly of claim 1, wherein the second release member comprises a lever member pivotally coupled to a linkage assembly on an inside portion of the safety cover, the linkage assembly comprising an arm member that is configured to engage the pin member.

6. The canopy release assembly of claim 5, wherein a lateral movement of the lever member causes a corresponding movement of the arm member to move the pin assembly from the locked state to the unlocked state when the safety cover is in the closed state.

7. The canopy release assembly of claim 1, wherein the cover is configured to pivot away from a front of the canopy release assembly in the open state of the cover.

8. The canopy release assembly of claim 1, wherein the second release member comprises a laterally activated lever, the laterally activated lever being disposed on a side of the cover.

9. The canopy release assembly of claim 8, further comprising a catch member pivotally coupled to the cover, the catch member comprising a hook portion configured to engage an opening in the laterally activated lever to retain the laterally activated lever in a locked state.

10. The canopy release assembly of claim 9, wherein the catch member is configured to release the hook portion from the opening in the laterally activated lever when a downward force is applied to the catch member.

11. The canopy release assembly of claim 10, wherein the laterally activated lever is configured to pivot away from a side of the cover when a lateral force is applied to the lever relative to a front of the canopy release assembly.

12. The canopy release assembly of claim 1, wherein the base plate member has a top portion with a first opening and a bottom portion with a second opening, the first opening and second opening configured to receive respective web members of a parachute harness assembly, and an activation lanyard of the parachute harness assembly is retained by the pin assembly in the locked state.

13. The canopy release assembly of claim 12, where in the unlocked state of the pin assembly, the activation lanyard is released.

14. A canopy release assembly for a parachute, comprising:
   a base plate member;
   a cover pivotally coupled to the base plate member and configured to pivot between an open state and a closed state;
   an activation lanyard retaining member movably coupled to the base plate member and configured to move between an unlocked state and a locked state;
   a first release member having one end coupled to the activation lanyard retaining member configured to move the activation lanyard retaining member to the unlocked state in the open state of the cover; and
   a laterally activated second release member disposed on an inside portion of the cover and configured to movably engage the activation lanyard retaining member to the unlocked state in the closed state of the cover.

15. The canopy release assembly of claim 14, wherein the first release member comprises a pair of spring arms having a normally expanded state in the open state of the cover, the second end of the first release member comprising a handle member that is exposed in the open state of the cover, and wherein a pull force on the handle member exerts a force on the activation lanyard retaining member to move the activation lanyard retaining member to the unlocked state.

16. The canopy release assembly of claim 14, comprising a lever on a side of the canopy release system and wherein the laterally second release member comprises a linkage assembly disposed on the inside portion of the cover, the lever being pivotally coupled to the linkage assembly, wherein, in the closed state of the cover, a force applied to the lever causes the linkage assembly to engage the activation lanyard retaining member to move the member from the locked state to the unlocked state.

17. The canopy release assembly of claim 14, comprising a spring assembly biased between the activation lanyard retaining member and a spring base member, the spring assembly configured to retain the activation lanyard retaining member in the locked state.

18. A latching assembly for a parachute canopy release, the latching assembly comprising:
   a base plate member;
   an activation lanyard retaining member movably coupled to the base plate member;
   a cover pivotally coupled to the base plate member, the cover having a first closed state that covers the activation lanyard retaining member and a second open state where the activation lanyard retaining member is not covered;
   a pull release coupled to the activation lanyard retaining member that is configured to be activated when the cover is in the second open state;
   a lever disposed on a side of the cover, the lever configured to be activated when the cover is in the first closed state;
   wherein activation of the pull release or lever moves the activation lanyard retaining member to a release position.

19. The canopy release system of claim 18, wherein the activation lanyard is releasably coupled to a riser ring of a parachute.

20. The canopy release system of claim 19, wherein a top end of the base plate member includes an opening and the bottom end of the base plate member includes an opening, a webbing of a harness assembly for the parachute configured to be received in each opening to secure the base plate member to the harness.

* * * * *